United States Patent
Hessling-Von Heimendahl et al.

(10) Patent No.: US 10,136,492 B2
(45) Date of Patent: Nov. 20, 2018

(54) HELICOPTER SEARCH LIGHT

(71) Applicant: Goodrich Lighting Systems GmbH, Lippstadt (DE)

(72) Inventors: Andre Hessling-Von Heimendahl, Koblenz (DE); Christian Schoen, Mainz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 15/648,539

(22) Filed: Jul. 13, 2017

(65) Prior Publication Data

US 2018/0020518 A1    Jan. 18, 2018

(30) Foreign Application Priority Data

Jul. 16, 2016    (EP) .................................... 16179834

(51) Int. Cl.
*B64D 47/02*    (2006.01)
*H05B 33/08*    (2006.01)

(52) U.S. Cl.
CPC ......... *H05B 33/0851* (2013.01); *B64D 47/02* (2013.01); *B64D 2203/00* (2013.01)

(58) Field of Classification Search
CPC .... H05B 37/02; H05B 37/0227; H05B 33/08; H05B 33/0854; B64D 47/02; B64D 47/04; B64D 47/06; G01S 17/02; G01S 17/42

See application file for complete search history.

(56) References Cited

U.S. PATENT DOCUMENTS

| | | | | |
|---|---|---|---|---|
| 5,589,901 A | * | 12/1996 | Means | B64D 47/08 348/144 |
| 2003/0086251 A1 | * | 5/2003 | Hamilton | B64D 47/04 362/12 |
| 2008/0137353 A1 | * | 6/2008 | Larsen | B64D 47/04 362/470 |
| 2012/0261516 A1 | * | 10/2012 | Gilliland | G01S 17/107 244/183 |
| 2013/0182449 A1 | | 7/2013 | Fidanza | |
| 2015/0130644 A1 | | 5/2015 | Kiel | |
| 2016/0107767 A1 | * | 4/2016 | Jha | B64D 47/02 362/470 |

FOREIGN PATENT DOCUMENTS

| | | |
|---|---|---|
| EP | 2199152 A1 | 6/2010 |
| EP | 3012151 A1 | 4/2016 |

OTHER PUBLICATIONS

European Search Report for Application No. 16179834.3-1762, dated Jan. 20, 2017, 7 pages.

* cited by examiner

*Primary Examiner* — Thai Pham
(74) *Attorney, Agent, or Firm* — Cantor Colburn LLP (57) ABSTRACT

A helicopter search light comprises: a lighting arrangement, having at least one light source, the lighting arrangement having an adjustable light output; a light detector, which is configured for detecting light emitted by the at least one light source and reflected by the ground and/or at least one item on the ground and for providing a detection signal which is correlated to an amount of light detected; and a control unit which is configured for controlling the adjustable light output of the lighting arrangement of the helicopter search light depending on the detection signal provided by the light detector.

12 Claims, 4 Drawing Sheets

HELICOPTER SEARCH LIGHT

FOREIGN PRIORITY

This application claims priority to European Patent Application No. 16 179 834.3 filed Jul. 16, 2016, the entire contents of which is incorporated herein by reference.

TECHNICAL FIELD

The present invention is in the field of exterior helicopter lighting. The present invention in particular relates to helicopter search lights.

BACKGROUND

Helicopters are often equipped with so-called helicopter search lights. Such helicopter search lights are provided for illuminating the environment of the helicopter, in particular for illuminating the ground in an area in front of and below the helicopter. Helicopter search lights are particularly used for inspecting the ground for potential obstacles, such as power lines, tress, etc., in particular during a landing approach.

The result of operating currently available helicopter search lights is not satisfactory under all environmental conditions: When using the helicopter search light, the brightness, i.e. the luminance measured in cd/m2, of the ground, as it is seen by the pilot, can change by some orders of magnitude within fractions of a second. This may happen due to different ground scenarios, such as forests, water, streets, snow covered areas etc., as well as due to sudden changes of the distance between the helicopter and the illuminated objects, e.g. when flying in a downtown area with high buildings in between. Due to the adaptation delay of the human eye such a fast change of the luminance may cause temporary loss of sight of the pilot. This not only is inconvenient for the pilot, but may also result in dangerous situations.

Accordingly, it would be beneficial to provide a helicopter search light that is capable of providing improved illumination in particular under changing environmental conditions.

SUMMARY

Exemplary embodiments of the invention include a helicopter search light comprising a lighting arrangement having an adjustable light output, a light detector, and a control unit. The lighting arrangement has at least one light source. The light detector is configured for detecting light emitted by the at least one light source and reflected by the ground and/or at least one item on the ground and for providing a detection signal which is correlated to an amount of light detected. The control unit is configured for controlling the adjustable light output of the lighting arrangement of the helicopter search light depending on the detection signal provided by the light detector.

Exemplary embodiments of the invention further include a method of adjusting a light output of a helicopter search light, wherein the helicopter search light has a lighting arrangement comprising at least one light source and an adjustable light output. The method includes: emitting light from the lighting arrangement of the helicopter search light and detecting light reflected by the ground and/or an item on the ground and providing a detection signal which is correlated to the amount of detected light. The method further includes controlling the adjustable light output of the lighting arrangement as a function of the detection signal.

According to exemplary embodiments of the invention, a basically dark (weakly reflecting) surface such as a forest will be illuminated with more intensity of light than a bright (highly reflecting) area such as a snow covered area. In consequence, the luminance, i.e. the brightness perceived by the pilot, will stay constant or at least change significantly less than in a situation in which the intensity of the light emitted by the lighting arrangement is not adjusted. The light detector also detects light reflected by the ground which originates from other light sources than the helicopter search light, such as from the moon or from other stationary or mobile artificial light sources. In consequence, this additional light may also be taken into account when the light output of the lighting arrangement is adjusted as a function of the detection signal.

As a result, fast changes of the luminance, which may cause a temporary loss of sight for the pilot due to the adaptation delay of the human eye, may be considerably reduced or even avoided. In consequence, the vision of the pilot is considerably improved even under fast changing environmental conditions, and the safety as well as the convenience of the pilot are considerably enhanced.

According to a further embodiment, the lighting arrangement is operable in a flood light mode and in a spot light mode. In particular, it is switchable between the flood light mode and the spot light mode. The spot light mode sometimes also is called "search mode" or "pencil mode". When the lighting arrangement is operated in the spot light mode, a narrow beam of light is emitted from the helicopter search light. When the lighting arrangement is operated in the flood light mode, the light emitted from the helicopter search light is distributed over an area which is considerably lager than in the spot light mode. In consequence, the flood light allows to illuminate a wide area of the ground, in particular when the helicopter is positioned at a low height, i.e. relatively close to the ground. In contrast, in the spot light mode, the light emitted by the at least one adjustable light source is concentrated to a relatively small area ("spot"). This is in particular preferable when the helicopter is flying at larger heights in some distance from the ground and the amount of light, which would reach the ground when the at least one adjustable light source is operated in the flood light mode, does not provide sufficient illumination.

According to a further embodiment, the control unit is configured for switching the lighting arrangement between the flood light mode and the spot light mode depending on a detection signal provided by the light detector. Switching the lighting arrangement between the flood light mode and the spot light mode depending on a detection signal, which is provided by the light detector, allows to adjust the illumination of the ground, in particular based on its reflective properties. In case of a bright (highly reflective) ground reflecting a large portion of the light hitting the ground, such as a snow covered ground, the helicopter light system may be switched into the flood light mode. In case of a dark (weakly reflecting) ground, reflecting only a small portion of the light hitting the ground, such as a forest, the lighting arrangement may be switched into the spot light mode in order to concentrate the light emitted by the lighting arrangement to a comparatively small area of the ground for compensating for the reduced reflective properties. In consequence, the luminace, i.e. the impression of brightness of the ground in the pilot's eyes, is very similar in both situations. As a result, the pilot's eyes do not need to adapt considerably when the ground changes from a light ground to a dark ground or vice versa during the flight of the helicopter.

The helicopter search light in particular may comprise a first optic for focusing the light in order to provide the desired spot light functionality. The helicopter search light in particular may comprise a second optic for distributing the light in order to provide the desired flood light functionality.

According to a further embodiment, the control unit the lighting arrangement comprises at least one first light source, which is associated with the spot light mode. The at least one first light source is dimmable and the control unit is configured for controlling a dimming level of the at least one first light source depending on the detection signal provided by the light detector. The at least one first light source in particular may be continuously dimmable.

Controlling the dimming level of the at least one first light source allows for an even finer adjustment of the intensity of the light emitted by the helicopter light system in the spot light mode. This results in an even more constant luminance of the ground. In consequence, the need for the pilot's eyes to adapt to changing environmental conditions is reduced even further.

According to a further embodiment, the at least one first light source includes a plurality of first light sources, and the control unit is configured for uniformly controlling the dimming level of the plurality of first light sources. By uniformly adjusting the intensity of the light emitted by the plurality of first light sources, the intensity of the light emitted by the lighting arrangement may be adjusted very efficiently, without the need to control the dimming level of the plurality of first light sources individually.

According to a further embodiment, the lighting arrangement comprises at least one second light source, which is associated with the flood light mode. The at least one second light source is dimmable and the control unit is configured for controlling a dimming level of the at least one second light source depending on the detection signal provided by the light detector. The at least one second light source in particular may be continuously dimmable.

Controlling the dimming level of the at least one second light source allows for an even finer adjustment of the intensity of the light emitted by the helicopter light system in the flood light mode. This results in an even more constant luminance of the ground. In consequence, the need for the pilot's eyes to adapt to changing environmental conditions is reduced even further.

According to a further embodiment, the at least one second light source includes a plurality of second light sources, and the control unit is configured for uniformly controlling the dimming level of the plurality of second light sources. By unitarily adjusting the intensity of the light emitted by the plurality of second light sources, the intensity of the light emitted by the lighting arrangement may be adjusted very efficiently, without the need to control the dimming level of the plurality of second light sources individually.

According to a further embodiment, the control unit is configured for adjusting the adjustable light output of the lighting arrangement such that the amount of light detected by the light detector approaches a predetermined target value. In order to achieve this goal, a feedback control loop may be employed. Adjusting the adjustable light output of the lighting arrangement such that the amount of light detected by the light detector approaches a predetermined target value allows to keep the luminance of the ground as constant as possible.

According to a further embodiment, the light detector is a luminance detector. A luminance detector allows for a very accurate measurement of the amount of light reflected by the ground and/or at least one item on the ground. Moreover, a luminance measurement is a suitable indication of the brightness perceived by the human eye, thus allowing for an adjustment of the light output of the helicopter search light that is particularly pleasing to the human eye.

According to a further embodiment, the detection angle of the light detector is significantly smaller, in particular at least ten times smaller, than the light emission angle of the lighting arrangement. In an embodiment, the detection angle of the light detector is smaller than or equal to 5°, in particular smaller than or equal to 3°.

In case the detection angle of the light detector would be in the same range as the opening angle of the light distribution, the light detector would be able to measure only reflectance, but it could not account for the square root distance/luminance correlation. Considerably restricting the detection angle of the light detector, however, allows to use a photodetector instead of a comparatively expensive luminance detector as the light detector.

The light detector in particular may comprise a collimating lens and/or a parabolic reflector. The collimating lens and/or the parabolic reflector are configured for restricting the detection angle of the light detector. A collimating lens and/or a parabolic reflector allow to efficiently restrict the detection angle of the light detector with a high signal-to-noise (S/N) ratio.

BRIEF DESCRIPTION OF THE DRAWINGS

Further exemplary embodiments are described with respect to the accompanying drawings, wherein.

DETAILED DESCRIPTION

Figure 1:
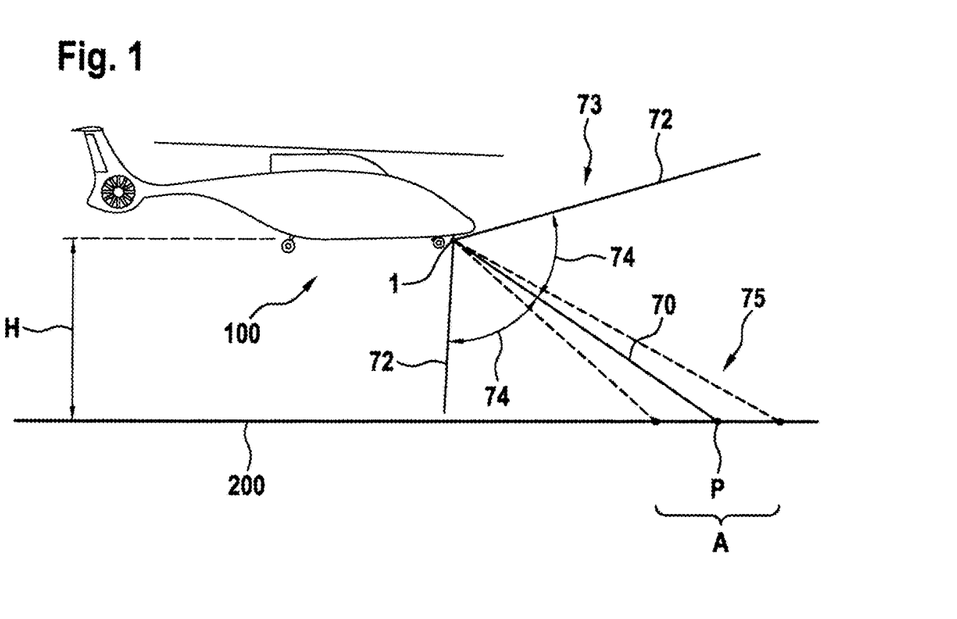
FIG. 1 shows a helicopter comprising a helicopter search light in accordance with an exemplary embodiment of the invention.

FIG. 1 shows a helicopter 100 flying at a height H above a ground 200. The helicopter 100 is equipped with a helicopter search light 1, which is mounted to a front bottom portion of the helicopter 100. The helicopter search light 1 comprises a lighting arrangement 2 having an adjustable light output. Line 70 in FIG. 1 indicates the main direction of the light emitted by the helicopter search light 1.

The lighting arrangement 2 of the helicopter search light 1 may have at least two modes of operation: a flood light mode and a spot light mode. The spot light mode is sometimes called "search mode" or "pencil mode".

When the helicopter search light 1 is operated in the spot light mode, a narrow beam of light 75, as it is schematically defined by the dashes lines, is emitted from the helicopter search light 1, substantially in the direction of line 70. The pilot may thus inspect the ground 200 in an area A around a position P where the line 70 representing the main light emission direction meets the ground 200. In the spot light mode, the light emitted by the helicopter search light 1 is bundled along the main light emission direction. As a result, the ground 200 is brightly illuminated in a relatively small area A, which is located around the position P, allowing for a close and thorough inspection by the pilot.

In the flood light mode, the lighting power of the lighting arrangement 2 is distributed between the lines 72 defining a much broader cone 73 around the main light emission direction 70. The cone 73 may have an opening angle of some 100°, which is indicated by the two angles 74 shown in FIG. 1. Using the flood light mode, the pilot may inspect a larger portion of the environment than in the spot light mode. Since in the flood light mode the lighting power of the helicopter search light 1 is distributed over a larger angular region and thus over a larger area than in the spot light mode, the luminance of the ground 200 is considerably less than in the spot light mode. In consequence, the flood light mode is usually used only when the helicopter 100 is flying at low heights H, e.g. heights H of up to 20 mm, relatively close to the ground 200. In this situation, due to the reduced distance form the ground 200, the amount of light reaching the ground in the flood light mode is sufficient for ground inspection.

Figure 2:
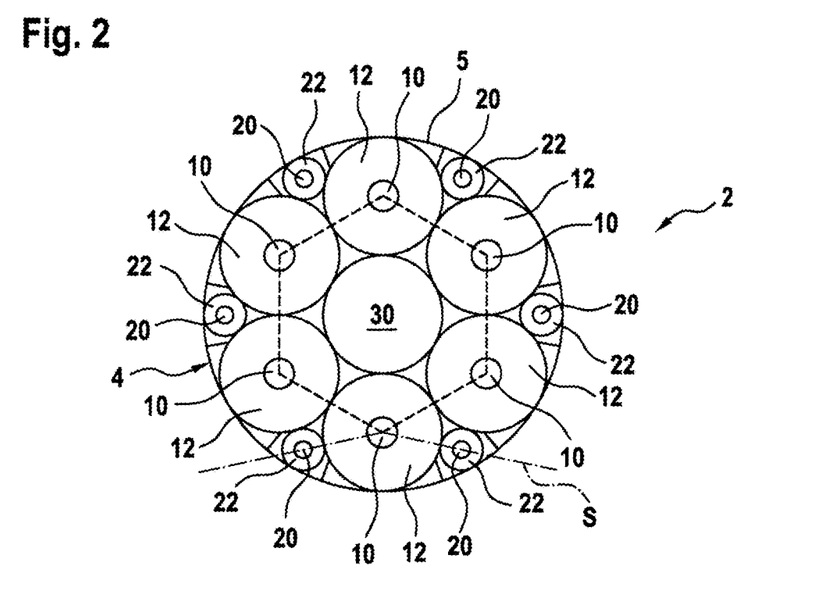
FIG. 2 shows a top view of a helicopter search light in accordance with an exemplary embodiment of the invention.

FIG. 2 shows a top view of a lighting arrangement 2 of a helicopter search light 1 in accordance with an exemplary embodiment of the invention.

The lighting arrangement 2 comprises a light head 4 having cylindrical side wall 5, whose upper edge is shown as a circle in the top view of FIG. 2. The lighting arrangement 2 further comprises six first light sources 10 and six second light sources 20 respectively arranged within the light head 4.

Each of the first and second light sources 10, 20 is associated with a corresponding optical system 12, 22. Each of the first light sources 10 has a respective first optical system 12 associated therewith, and each of the second light sources 20 has a respective second optical system 22 associated therewith.

In the exemplary embodiment of FIG. 2, the first optical systems 12 are of identical design. The respective combinations of the light sources 10, 20 and the optical systems 12, 22 are also cylindrical in shape.

The combinations of the first light sources 10 and the corresponding optical systems 12 have a size that allows to arranged six of these combinations within the light head 4 at the corners of an equilateral (virtual) hexagon, which is indicated by a dotted line in FIG. 2.

The six second light sources 20 are arranged in spaces provided between said six combinations, respectively consisting of said first light sources 10 and the associated optical systems 12, and the light head 4. Each of the second light sources 20 is associated with a respective second optical system 22. These combinations consisting of a second light source 20 and an associated second optical system 22 are packed between two of the first light sources 10 and the cylindrical side wall 5 of the light head 4, respectively.

The first light sources 10 are operated for providing the spot light mode of the lighting arrangement 2. The second light sources 20 are operated for providing the flood light mode of the lighting arrangement 2.

The helicopter search light 1 further comprises a light detector 30, which may be arranged in the center of the hexagon formed by the first light sources 10.

Alternatively the light detector 30 may by mounted at another position of the lighting arrangement 2 and/or of the helicopter 100. The light detector 30 e.g. may by located within the housing 4 at the position of any of the first and second light sources 10, 20. In this case, a first or second light source 10, 20 may be arranged at the center of the lighting arrangement 2, i.e. at the position of the light detector 30 shown in FIG. 2. In a further configuration, which is not shown in the Figures, the light detector 30 may be arranged at the fuselage of the helicopter 100 outside the housing 4 of the lighting arrangement 2.

Figure 3:
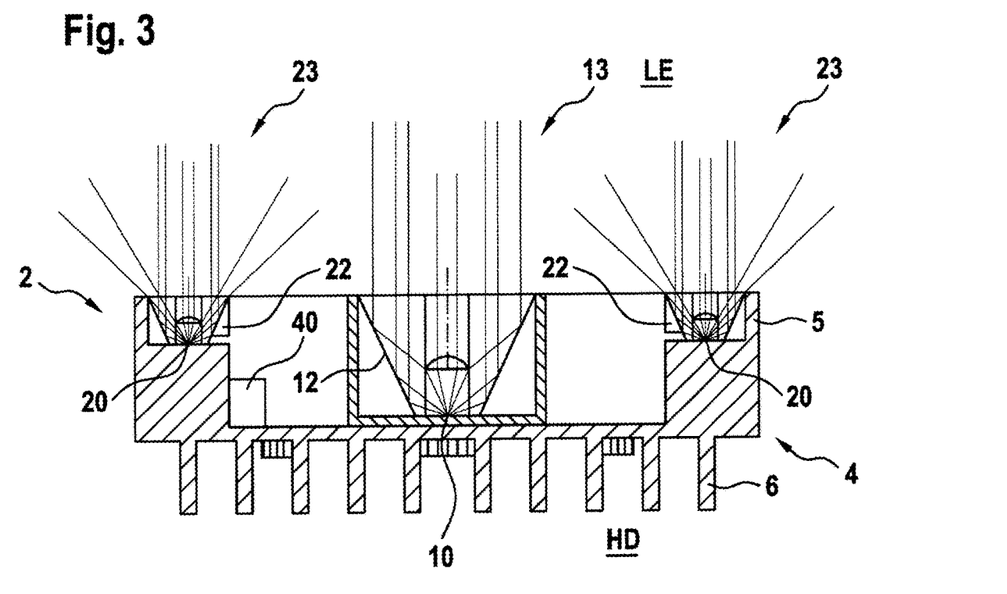
FIG. 3 shows a cross-sectional view through the helicopter search light of FIG. 2.

A cross-sectional view of the helicopter search light 1 shown in FIG. 2 is shown in FIG. 3. The cross-sectional plane of FIG. 3 is oriented along line S drawn in FIG. 2. The cross-sectional view of FIG. 3 illustrates the straight extension (in the top/bottom dimension) of the cylindrical wall 5 of the housing 4. The helicopter search light 1 has a light emission side LE, depicted as the top side in the viewing plane of FIG. 3, and a heat discharge side HD, which is depicted as the bottom side in the viewing plane of FIG. 3. For said heat discharge, the housing 4 is equipped with a cooling rib structure 6 providing a heat sink for the light sources 10, 20 arranged within the housing 4.

A first light source 10 is illustrated in the cross-sectional view shown in FIG. 3. A first optical system 12 is arranged above and around the first light source 10. The first optical system 12 comprises a collimating lens and/or a collimating reflector. As illustrated by the exemplary light rays 13 of FIG. 3, the collimating lens and the collimating reflector alter the direction of the light rays 13, emitted by the first light source 10, in such a way that they all leave the helicopter search light 1 in substantially the same direction, namely towards the top in the viewing plane of FIG. 3. This substantially collimated light is emitted by the helicopter search light 1 in the spot light mode.

Two second light sources 20 that are arranged adjacent the cylindrical side wall 5 of the housing 4 are visible in the cross-sectional view of FIG. 3. In other words, one second light source 20 is arranged adjacent the side wall 5 of the housing 4 on the right side of the helicopter search light 1 in the viewing plane of FIG. 3, while the other second light source 20 is arranged adjacent the side wall 5 of the housing 4 on the left side of the helicopter search light 1 in the viewing plane of FIG. 3.

Each of the two second light sources 20 comprises a second optical system 22 associated therewith. The second optical systems 22 are arranged above and around the second light sources 20 in the viewing plane of FIG. 3. In the exemplary embodiment of FIGS. 2 and 3, each second optical system 22 comprises a reflector. The reflector reflects a portion of the light emitted by the respective second light source 20 towards the main light emission direction, i.e. towards the direction normal to the housing 4, i.e. normal to the whole helicopter search light 1. Much of the light of the second light sources 20 leaves the helicopter search light 1 in an unaltered manner. Overall, the second optical system 22 is designed in such a way that a controlled stray light distribution leaves the helicopter search light 1. This is illustrated by the exemplary light rays 23 of FIG. 3. It is also possible that each of the second optical systems 22 comprises a respective lens that provides for the controlled stray light distribution. The light from the second light sources 20 is emitted by the helicopter search light 1 in the flood light mode.

The first and second light sources 10, 20 may comprise LEDs, in particular LEDs emitting light in the visible light range, i.e. light that is visible to the human eye. Alternatively or additionally, at least one of the first and second light sources 10, 20 may be configured for emitting infrared and/or ultraviolet light, which is visiable to the human eye with the help of an appropriate device such as a night vision device.

Figure 5:
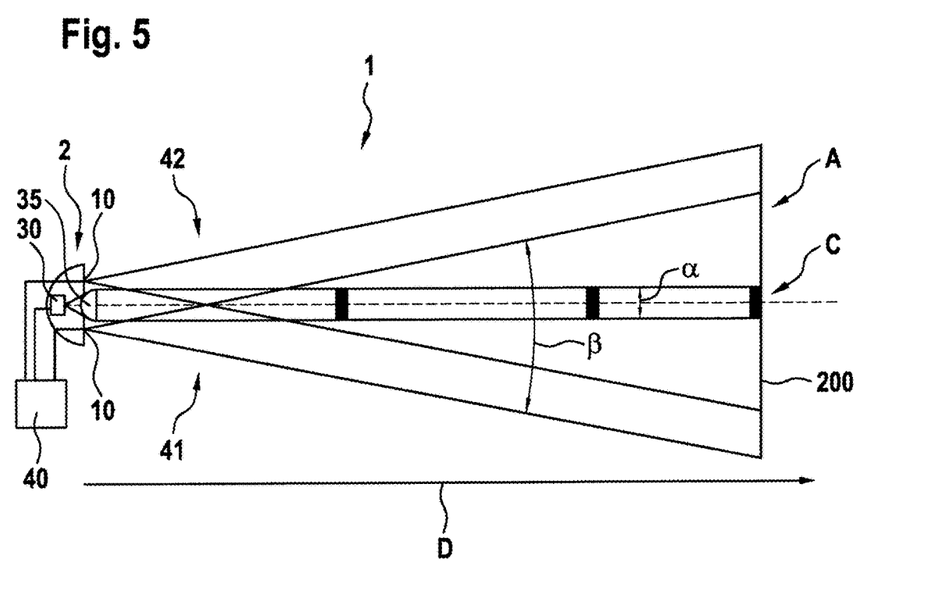
FIG. 5 is a schematic drawing of a helicopter search light according to an exemplary embodiment of the invention.

The helicopter search light 1 further comprises a control unit 40 (see FIG. 5). The control unit 40 may be provided within or next to the light head 4. Alternatively, the control unit 40 may be arranged in another part of the helicopter 100, e.g. in the cockpit of the helicopter 100.

The control unit 40 in particular includes a switching circuit. The switching circuit is electrically coupled to an electrical power source (not shown), as well as to the first and second light sources 10, 20. The switching circuit allows for selectively switching the first and second light sources 10, 20 on and off. The switching circuit in particular allows for selectively switching between the spot light mode, in which the first light sources 10 are switched on and the second light sources 20 are switched off, and the flood light mode, in which the second light sources 20 are switched on and the first light sources 10 are switched off. The switching circuit further may allow to operate the helicopter search light 1 in a combined mode, in which both, the first and second light sources 10, 20, are simultaneously switched on. Moreover, the control unit may be configured to dim the first light sources 10 and/or the second light sources 20.

Figure 4:
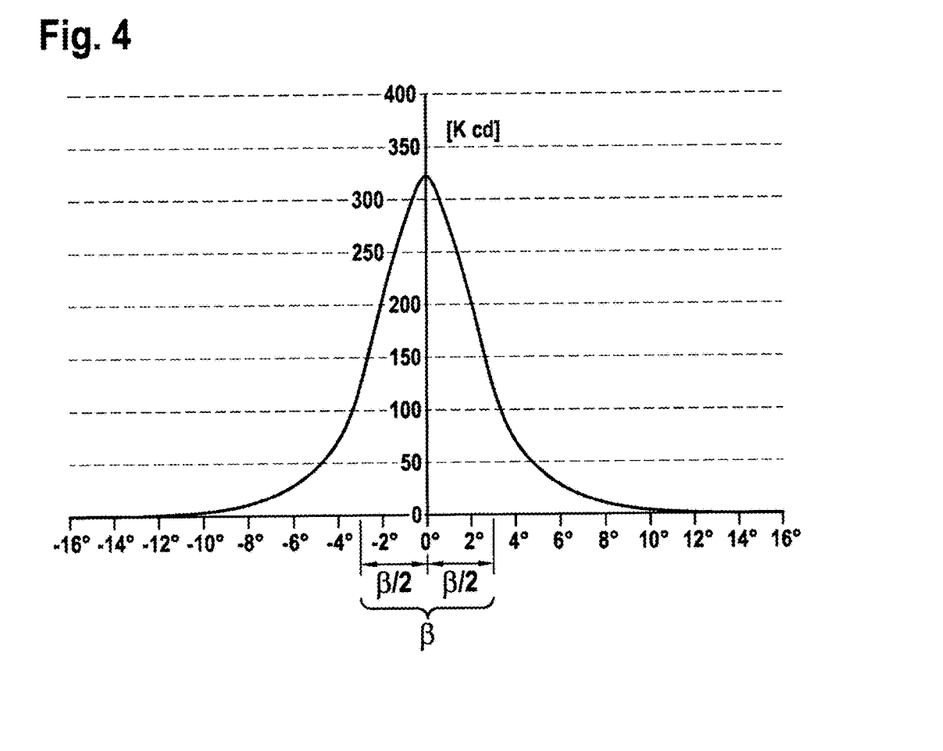
FIG. 4 illustrates an exemplary angular intensity distribution of the light emitted by a helicopter search light according to an exemplary embodiment of the invention.

FIG. 4 illustrates an exemplary angular intensity distribution of the light emitted by a lighting arrangement 2 of a helicopter search light 1 according to an exemplary embodiment of the invention operated in the spot light mode.

The light cone emitted by the lighting arrangement 2 has a half beam angle (β/2) of approximately 3° and a peak intensity at the center of the beam (at an angle of 0°) of 310,000 to 320,000 cd. Thus, FIG. 4 shows that the light emitted by the lighting arrangement 2 is concentrated in a narrow beam having an opening angle β of approximately 6°.

FIG. 5 is a schematic drawing depicting a helicopter search light 1 according to an exemplary embodiment of the invention.

FIG. 5 in particular exemplarily shows two light cones 41, 42 emitted by two first light sources 10. The skilled person will understand that a similar picture may be drawn for light cones emitted by the second light sources 20 as well. The skilled person will further understand that the light cones virtually entirely overlap in the far field, i.e. that the two light cones illuminate virtually the same ground area, as the distance between the helicopter search light 1 and the ground is generally much bigger than the distance between the two first light sources 10. Due to the limited extension that can be depicted in FIG. 5, this far-field effect is not shown in FIG. 5, but will be readily appreciated by the skilled person. For this reason, the opening angle β of the light beam emitted by the helicopter search light 1 is indicated as the opening angle of the light cone 41 only.

FIG. 5 shows that the area A of the ground 200, which is covered by the light cones 41, 42, increases with increasing distance D from the light source 10. In fact, the amount of area A increases quadratically with the distance D. In consequence, the brightness of the illuminated area A quadratically decreases with increasing distance D from the light source 10.

According to an exemplary embodiment of the present invention, the luminance of a constant or at least substantially constant central portion C of the illuminated area A is measured. The brightness of a constant central portion (detection area) C of the illuminated area A in particular is measured by means of the light detector 30. The control unit 40 controls the first light sources 10 such that the detection signals provided by the light detector 30 approach a predetermined target value. As a result, the luminance, i.e. the impression of brightness of the area A in the pilot's eye, is kept as constant a possible even if the reflectivity of the area A or its distance D form the lighting arrangement 2 changes.

One possible option for the light detector 30 is a combination of a commercially available luminance detector comprising a photo detector, which may include a CCD, and a distance meter. Such a luminance detector allows to calculate the luminance of the ground 200 from the amount of reflected light detected by the photo detector in combination with the distance D between the helicopter 100 and the illuminated surface area A, which is measured by the distance meter.

As a less complex, more easily implementable and less expensive alternative to a luminance detector, a light detector 30 whose angle of detection α is restricted to a relatively narrow angle may be used. Due to the relatively small angle of detection α, the size of the detection area C will remain basically constant even if the distance D between the light detector 30 and the ground 200 changes.

The angle of detection α in particular may be at least an order of magnitude (ten times) smaller than the opening angle β of the light cones 41, 42.

As in this case the size of the detection area C, which is covered by the light detector 30, is basically independent of the distance D between the light detector 30 and the ground 200, such a light detector 30 is basically performing a virtual spot measurement. The result of such a measurement may be interpreted as an indication of the luminance. This approximation of the luminance is suitable for the desired purpose of controlling the first and/or second light sources 10, 20 according to exemplary embodiments of the invention.

In contrast, in case the angle of detection α of the light detector 30 would be in the same range as the opening angle β of the light distribution of the light cones 41, 42, the light detector 30 would measure only the reflectance, but could not adjust to the distance/luminance correlation. Thus, the angle of detection α of the light detector 30 is chosen to be significant smaller than the opening angle β of the light sources 10, 20 according to exemplary embodiments.

An optical system 35 comprising a pin hole aperture or an optical system 35 having a better signal-to-noise (S/N) ratio than a pin hole aperture, such as a collimating lens and/or a parabolic reflector, may be used for reducing the detection angle of the light detector 30 appropriately, in particular to a detection angle of less than or equal to 3°.

The detection signal provided by the light detector 30 is delivered to the control unit 40, which may include a feedback loop. In order to achieve the desired constant luminance, the control unit 40 is configured for switching between the spot light mode and the flood light mode and/or for dimming the light emitted by the light sources 10, 20 based on the detection signal provided by the light detector 30.

Figure 6:
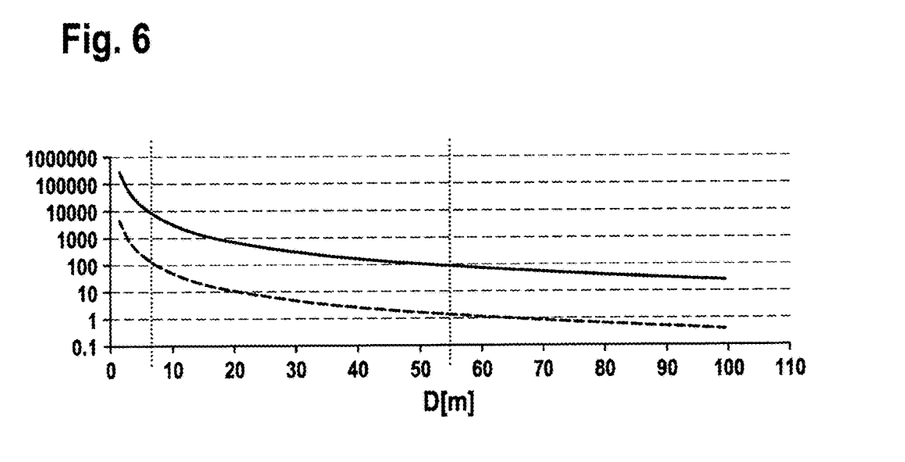
FIG. 6 depicts the illuminance on an exemplary ground as a function of the distance from the ground in the flood light mode and in the spot light mode.

FIG. 6 depicts a graph illustrating the illuminance (y-axis) on an exemplary ground 200 as a function of the distance D (x-axis) from said ground 200 in the flood light mode (dashed line) and in the spot light mode (solid line), respectively. FIG. 6 in particular illustrates that the illuminance on the ground 200 rapidly decreases with increasing distance D from the ground. This effect is in particular prominent in an area close to the ground, i.e. at distances D between 0 m and 20 m.

Figure 7:
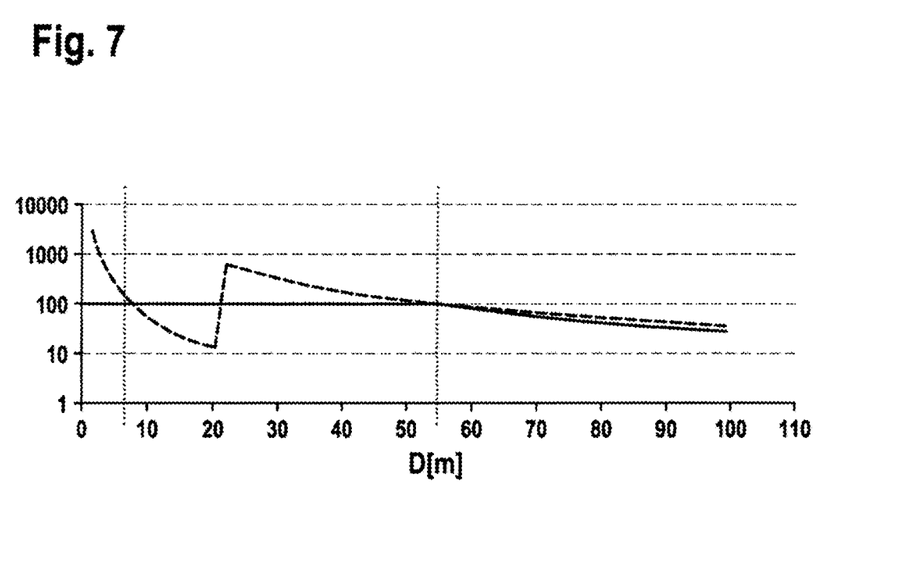
FIG. 7 illustrates the illuminance on an exemplary ground as a function of the distance from the ground in a first (conventional) mode and in a second mode according to an exemplary embodiment of the invention.

FIG. 7 illustrates the illuminance (y-axis) on the exemplary ground 200 as a function of the distance D (x-axis) from the ground 200 in a first mode (dashed line) and in a second mode (solid line).

In the first mode, which is indicated by the dashed line, the operation of the lighting arrangement 2 of the helicopter search light 1 is switched from flood light mode to spot light mode at a height H (distance D) of 20 m, but no dimming is performed. In the second mode, which is represented by the solid line, the light emitted by the lighting arrangement 2 of the helicopter search light 1 is dimmed according to an exemplary embodiment of the invention.

In the first mode, the illuminance on the ground drastically decreases when the distance D increases from 0 to 20 m. At a distance D of 20 m the lighting arrangement 2 of the helicopter search light 1 is switched from flood light mode to spot light mode. This switching operation results in a step/jump of the illuminance of the ground from about 10 1x to almost 1000 1x. Of course, the illuminated area is drastically reduced, when the lighting arrangement 2 is switched from flood light mode to spot light mode. When the distance D from the ground 200 further increases, the illuminance decreases to a value of about 100 1x at a distance D of 55 m.

Figure 8:
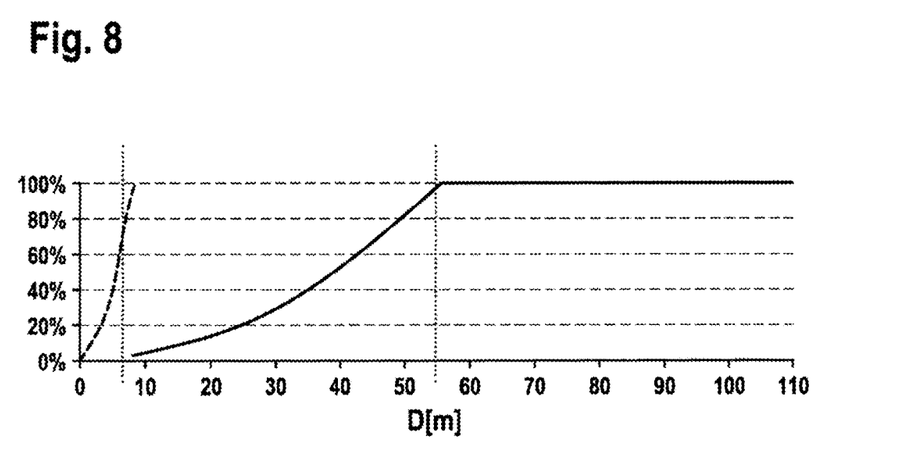
FIG. 8 illustrates the dimming of the helicopter search light in the flood light mode and in the spot light mode.

In the second mode (solid line) the light emitted by the lighting arrangement 2 of the helicopter search light 1 is dimmed according to exemplary embodiments of the invention. As a result, the illuminance is kept constant in the range of distances D (heights H) between 0 m and 55 m from the ground 200. When operated in the second mode, the lighting arrangement 2 is switched from flood light mode into spot light mode at a distance D of about 8 m. However, due to the dimming of the light sources 10, 20, as it is illustrated in FIG. 8 (solid line: light emission of the first light sources 10; dashed line: light emission of the second light sources 20), the step/jump of the illuminance caused by the switching from flood light mode into spot light mode is avoided, and the illuminance is kept constant up to a distance D of approximately 55 m. At distances D of more than 55 m, the first light sources 10 are not dimmed but operated with full power (see solid curve in FIG. 8), but the power of said light sources 10 is not sufficient for keeping the illuminance constant for distances D of more than 55 m.

In both the first mode and the second mode, depicted in FIG. 7, the control unit 40 controls the helicopter search light 1 such that the measured illuminance is as close to the target value of 100 1x as possible. In other words, the control unit 40 controls the helicopter search light 1 to approach an appropriate target value for the detected light that corresponds to an illuminance of 100 1x on the ground. The difference between the two modes is that the control unit 40 only relies on switching between the spot light mode and the flood light mode in the first mode, while the control unit 40 additionally relies on dimming of the first and second light sources in the second mode.

The skilled person will understand that the specific values comprised in FIGS. 6 to 8 and the related description are only exemplary. They in particular strongly depend on the numbers and properties, in particular the power, of the light sources 10, 20. The values in particular may be shifted to higher illuminance values and/or distances by employing more and/or stronger light sources 10, 20. The values will shift to lower illuminance values and/or distances in case less and/or weaker light sources 10, 20 are used.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A helicopter search light comprising
a lighting arrangement, having at least one light source, the lighting arrangement having an adjustable light output;
a light detector, which is configured for detecting light emitted by the at least one light source and reflected by and at least one of the ground and at least one item on the ground and for providing a detection signal which is correlated to an amount of light detected; and
a control unit which is configured for controlling the adjustable light output of the lighting arrangement of the helicopter search light depending on the detection signal provided by the light detector,
wherein the lighting arrangement has a flood light mode and a spot light mode and wherein the lighting arrangement is switchable between the flood light mode and the spot light mode, and
wherein the control unit is configured for switching the lighting arrangement between the flood light mode and the spot light mode depending on the detection signal provided by the light detector.

2. The helicopter search light according to claim 1, wherein the lighting arrangement has at least one first light source, associated with the spot light mode, with the at least one first light source being dimmable and with the control unit controlling a dimming level of the at least one first light source depending on the detection signal provided by the light detector.

3. The helicopter search light according to claim 2, wherein the at least one first light source is a plurality of first light sources, with the control unit uniformly controlling the dimming level of the plurality of first light sources.

4. The helicopter search light according to claim 1, wherein the lighting arrangement has at least one second light source, associated with the flood light mode, with the at least one second light source being dimmable and with the control unit controlling a dimming level of the at least one second light source depending on the detection signal provided by the light detector.

5. The helicopter search light according to claim 4, wherein the at least one second light source is a plurality of second light sources, with the control unit uniformly controlling the dimming level of the plurality of second light sources.

6. The helicopter search light according to claim 1, wherein the control unit is configured for adjusting the adjustable light output of the lighting arrangement such that the amount of light detected by the light detector approaches a target value.

7. The helicopter search light according to claim 1, wherein a detection angle of the light detector is significantly smaller, in particular at least 10 times smaller, than a light emission angle of the lighting arrangement, wherein the detection angle of the light detector in particular is smaller or equal to 3°.

8. The search light system according to claim 1, wherein the light detector comprises at least one of a collimating lens and a parabolic reflector, with the at least one of the collimating lens and the parabolic reflector restricting the detection angle of the at least one light detector.

9. The helicopter search light according to claim 1, wherein the light detector is a luminance detector.

10. A method of adjusting a light output of a helicopter search light, with the helicopter search light having a lighting arrangement, comprising at least one light source and having an adjustable light output, wherein the method includes:
   emitting light from the lighting arrangement of the helicopter search light,
   detecting light reflected by at least one of the ground and an item on the ground and providing a detection signal which is correlated to an amount of light detected; and
   controlling the adjustable light output of the lighting arrangement of the helicopter search light depending on the detection signal,
   wherein the step of controlling the adjustable light output of the lighting arrangement of the helicopter search light includes switching the lighting arrangement between a flood light mode and a spot light mode.

11. The method according to claim 10, wherein the lighting arrangement of the helicopter search light comprises at least one first light source, associated with the spot light mode, and at least one second light source, associated with the flood light mode, and wherein the step of controlling the adjustable light output of the lighting arrangement of the helicopter search light comprises at least one of:
   dimming the at least one first light source depending on the detection signal, and
   dimming the at least one second light source depending on the detection signal.

12. The method according to any of claim 10, wherein the step of detecting light reflected by at least one of the ground and an item on the ground includes performing a luminance measurement.

* * * * *